US012769905B2

(12) United States Patent
Tsuji et al.

(10) Patent No.: US 12,769,905 B2
(45) Date of Patent: Oct. 20, 2026

(54) METHOD OF SEMICONDUCTOR PROCESS SIMULATION

(71) Applicant: Samsung Electronics Co., Ltd., Suwon-si (KR)

(72) Inventors: Yukihide Tsuji, Suwon-si (KR); Hisashi Kotakemori, Suwon-si (KR); Shinwook Yi, Suwon-si (KR); Yuntae Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 376 days.

(21) Appl. No.: 18/534,184

(22) Filed: Dec. 8, 2023

(65) Prior Publication Data

US 2024/0193323 A1 Jun. 13, 2024

(30) Foreign Application Priority Data

Dec. 9, 2022 (KR) ........................ 10-2022-0171859

(51) Int. Cl.
*G06F 17/50* (2006.01)
*G06F 30/20* (2020.01)
*G06F 119/18* (2020.01)

(52) U.S. Cl.
CPC .......... *G06F 30/20* (2020.01); *G06F 2119/18* (2020.01)

(58) Field of Classification Search
CPC ................. G06F 30/20; G06F 2119/18; G05B 19/41885; G05B 13/04; Y02P 90/02
See application file for complete search history.

(56) References Cited

U.S. PATENT DOCUMENTS

| | | | | |
|---|---|---|---|---|
| 5,301,318 | A | 4/1994 | Mittal | |
| 7,131,076 | B2 | 10/2006 | Sherstyuk et al. | |
| 8,745,626 | B1 | 6/2014 | Sandstrom | |
| 8,954,981 | B2 | 2/2015 | Harris et al. | |
| 9,037,448 | B2 | 5/2015 | Ito et al. | |
| 9,378,315 | B1 * | 6/2016 | Wu | G06F 30/20 |
| 10,061,577 | B2 | 8/2018 | Melski | |
| 10,447,608 | B2 | 10/2019 | Daniel et al. | |
| 11,093,840 | B2 | 8/2021 | Rothstein et al. | |

(Continued)

FOREIGN PATENT DOCUMENTS

| | | | |
|---|---|---|---|
| JP | 2008-084121 | A | 4/2008 |
| JP | 5882052 | B2 | 3/2016 |

OTHER PUBLICATIONS

Improving Scalability of Symbolic Execution for Software with Complex Environment Interfaces (Year: 2015).*

*Primary Examiner* — Masud Ahmed
(74) *Attorney, Agent, or Firm* — HARNESS, DICKEY & PIERCE, P.L.C.

(57) ABSTRACT

A simulation method of a semiconductor process includes receiving first input data including values of a plurality of parameters received from the outside, setting a simulation using the plurality of parameters, improving the simulation by ordering the plurality of parameters, and executing the simulation by processing a job stored in a queue, wherein the optimizing includes generating a table with respect to the plurality of parameters, ordering the plurality of parameters based on the first input data, generating a job tree based on the plurality of ordered parameters, reconstructing the table based on the job tree, and generating the queue by storing the job in the queue based on the reconstructed table.

20 Claims, 14 Drawing Sheets

(56) References Cited

U.S. PATENT DOCUMENTS

| | | | | |
|---|---|---|---|---|
| 11,314,907 | B2 | 4/2022 | Phatak et al. | |
| 2004/0049744 | A1 | 3/2004 | Sherstyuk et al. | |
| 2006/0062588 | A1 | 3/2006 | Saka et al. | |
| 2011/0252163 | A1 | 10/2011 | Villar et al. | |
| 2013/0086549 | A1 | 4/2013 | Riehl et al. | |
| 2013/0116802 | A1* | 5/2013 | Friman | G05B 17/02 700/30 |
| 2015/0193270 | A1 | 7/2015 | Archer et al. | |
| 2017/0242981 | A1* | 8/2017 | Devereux | G05B 17/02 |
| 2018/0284721 | A1* | 10/2018 | Amthor | G05B 19/4069 |
| 2020/0257570 | A1 | 8/2020 | Son et al. | |
| 2021/0073624 | A1 | 3/2021 | Yoo et al. | |
| 2021/0081586 | A1 | 3/2021 | Reiterer et al. | |
| 2022/0121800 | A1 | 4/2022 | Kim et al. | |
| 2022/0138397 | A1* | 5/2022 | Han | G06F 30/398 716/100 |
| 2022/0207217 | A1* | 6/2022 | Lee | G06N 20/00 |

* cited by examiner

FIG. 5

CREATE TABLE

Parameter Data

51

| (Exp-No) | 1 | 2 | 3 |
|---|---|---|---|
| paraA | 1.0 | 1.0 | 2.0 |
| paraB | 3 | 4 | 3 |
| paraC | 30 | 30 | 30 |
| paraD | 40 | 40 | 40 |

RE-ORDERED PARAMETERS

52

| (Exp-No) | 1 | 2 | 3 |
|---|---|---|---|
| paraC | 30 | 30 | 30 |
| paraD | 40 | 40 | 40 |
| paraA | 1.0 | 1.0 | 2.0 |
| paraB | 3 | 4 | 3 |

66

| (Exp-No) | 1 | 2 | 3 | 4 |
|---|---|---|---|---|
| paraC | 30 | 30 | 30 | 30 |
| paraD | 40 | 40 | 40 | 50 |
| paraA | 1.0 | 1.0 | 2.0 | 3.0 |
| paraB | 3 | 4 | 3 | 2 |

68

<table>
<tr><th>(Exp-No)</th><th>1</th><th>2</th><th>3</th><th>4</th></tr>
<tr><td>paraC</td><td colspan="4">30</td></tr>
<tr><td>paraD</td><td colspan="3">40</td><td>50</td></tr>
<tr><td>paraA</td><td colspan="2">1.0</td><td>2.0</td><td>3.0</td></tr>
<tr><td>paraB</td><td>3</td><td>4</td><td>3</td><td>2</td></tr>
</table>

METHOD OF SEMICONDUCTOR PROCESS SIMULATION

CROSS-REFERENCE TO RELATED APPLICATION

This application is based on and claims priority under 35 U.S.C. § 119 to Korean Patent Application No. 10-2022-0171859, filed on Dec. 9, 2022, in the Korean Intellectual Property Office, the disclosure of which is incorporated by reference herein in its entirety.

BACKGROUND

Various example embodiments relate a simulation method of a semiconductor process, and more particularly, to a method of improving or optimizing a simulation process of a semiconductor manufacturing process.

A semiconductor process may be performed based on layout data. For example, various patterns included in semiconductor devices may be formed on a semiconductor substrate by processes such as etching, deposition, and photolithography. Simulation based on a physical model may be carried out using various parameters such as process parameters and design parameters so that each of these semiconductor devices may have desired characteristics. At this time, finding an improved or optimal parameter from each of various parameters using simulation based on a physical model may be time consuming and/or expensive.

To perform simulation under various conditions, a simulation may be carried out with various values of parameters. As the semiconductor process becomes increasingly complex, performing complex simulation processes based on parameters having these various values may also become time consuming and/or expensive.

SUMMARY

Various example embodiments propose a method of carrying out a semiconductor process simulation more efficiently by optimizing a simulation process performed under various simulation conditions.

According some example embodiments, there is provided a simulation method of a semiconductor process including receiving first input data including values of a plurality of parameters received from the outside, setting a simulation using the plurality of parameters, improving the simulation by ordering of the plurality of parameters, and executing the simulation by processing a job stored in a queue. The improving includes generating a table with respect to the plurality of parameters, ordering the plurality of parameters based on the first input data, generating a job tree based on the plurality of ordered parameters, reconstructing the table based on the job tree, and generating the queue by storing the job in the queue based on the reconstructed table.

Alternatively or additionally according to some example embodiments, there is provided a simulation method of a semiconductor process including setting one or more simulators by receiving input data including values of a plurality of parameters, improving a simulation based on reordering of the plurality of parameters, and executing the simulation by processing a job stored in a queue. The improving of the simulation includes ordering the plurality of received parameters, performing reordering of the plurality of parameters based on the input data, generating a plurality of operation nodes based on the reordering, creating a parameter table based on the plurality of operation nodes, and generating the queue by storing the job in the queue based on the parameter table.

Alternatively or additionally according to some example embodiments, there is provided a simulation method of a semiconductor process including setting one or more simulators by receiving input data including values of a plurality of parameters, improving a simulation based on ordering of the plurality of parameters, and executing the simulation. The improving of the simulation includes ordering the plurality of parameters based on the input data, generating a job tree based on the plurality of ordered parameters, creating a parameter table based on the job tree, and generating a queue by storing a job in the queue based on the parameter table, the ordering of the plurality of parameters includes assigning a higher priority to a parameter as the number of same values increases among values corresponding to the same parameter.

BRIEF DESCRIPTION OF THE DRAWINGS

Various example embodiments will be more clearly understood from the following detailed description taken in conjunction with the accompanying drawings in which:

FIG. 5 is a flowchart illustrating a parameter ordering method of a semiconductor process simulation according to some example embodiments;

DETAILED DESCRIPTION OF VARIOUS EXAMPLE EMBODIMENTS

Hereinafter, various example embodiments will be described in detail with reference to the accompanying drawings.

Figure 1:
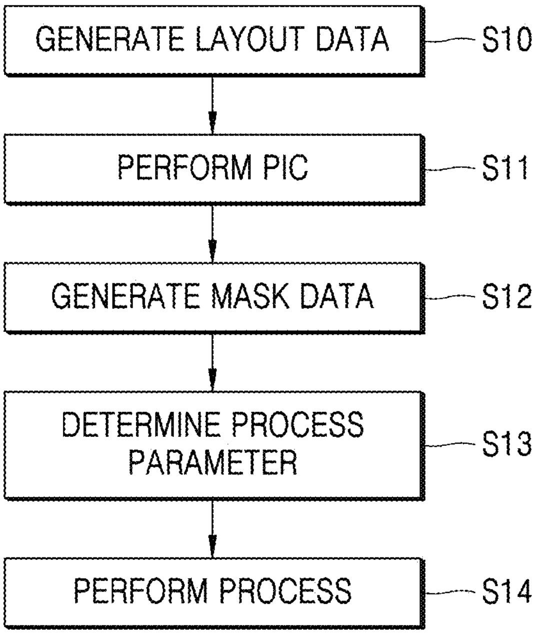
FIG. 1 is a flowchart illustrating a method of manufacturing a semiconductor device according to some example embodiments.

FIG. 1 is a flowchart illustrating a method of manufacturing a semiconductor device according to some example embodiments.

A semiconductor process for manufacturing a semiconductor device may include various processes such as a deposition process, a lithography process, an implantation process, an annealing process, an etching process, and a polishing process. Various semiconductor devices and wirings connecting the semiconductor devices may be formed by a semiconductor process. Referring to FIG. 1, layout data may be generated to manufacture the semiconductor device (S10). For example, the layout data may be generated by referring to a schematic circuit synthesized in a high-level design and/or a netlist corresponding thereto. A process of generating the layout data may include a routing procedure that places and connects various standard cells provided in a cell library according to the specified design rule. In addition, for example, the layout data may be provided in the form of graphic design system (GDS) data, and according to some example embodiments, a design rule check (DRC) on the layout data, and/or layout versus schematic (LVS) that verifies whether the layout data is consistent with intended design may be performed.

When the layout data is determined through the above processes, optical proximity correction (OPC) may be performed on the layout data (S11). Through OPC, distortion phenomena such as refraction and/or process effects that occur due to characteristics of light during exposure using a laid out pattern may be corrected or at least partly corrected or mitigated. After OPC is performed, mask data may be generated (S12). In general, a photomask may be fabricated by depicting or etching layout patterns using, for example, a chromium thin film applied on a glass substrate.

Thereafter, various semiconductor processes may be performed using the mask data. For example, an exposure process, an etching process, and a deposition process may be performed using the mask data. Process conditions may be determined (S13) to form a semiconductor device having desired characteristics through a semiconductor process using the mask data. For example, process conditions may include various conditions such as temperature and/or pressure inside a chamber in which a semiconductor process is performed, strength of an electric field accelerating particles in an etching process and/or an ion implantation process, etc.

In some example embodiments, a method of improving or optimizing a simulation process performed to confirm or help to confirm in advance the shape and/or characteristics of semiconductor devices manufactured by a semiconductor process is proposed. For example, in some example embodiments, a process of predicting shapes and/or characteristics of semiconductor devices may be improved or optimized based on parameters used in simulation of a semiconductor manufacturing process, as will described in detail below. For example, to predict the electrical characteristics of semiconductor devices more accurately, a simulation tool such as technology computer aided design (TCAD) may be used, and the use of hardware resources (e.g., computing nodes) used in the server may be reduced.

For example, when a server executes simulations collectively according to various conditions through a scheduler, there may be cases in which the same operation is repeatedly performed in different operation nodes, despite having the same conditions. In this case, a user and/or the like may need to or expect to manually edit an array of parameters and/or a tree structure of simulation, while checking simulation settings to improve or optimize a simulation environment. However, as the semiconductor manufacturing process becomes more sophisticated and/or the tree structure of simulation becomes longer and/or more complex, it may be difficult to manually perform the above improvement or optimization process, and may take a lot of effort and time to build a simulation environment. However, simulation conditions may be edited more flexibly by automatically improving or optimizing the simulation environment according to the proposal in some example embodiments. Alternatively or additionally, because the use of hardware resources used in the server is reduced through improvement or optimization, a simulation may be repeatedly executed through improved or optimal resource allocation without redundancy of operation resources (e.g., computing node).

In some example embodiments, characteristics of semiconductor devices may be predicted by receiving at least one of design variables representing the structure of semiconductor devices to be formed by a semiconductor process and/or process variables for controlling the semiconductor process, and performing an optimized or improved simulation process. For example, when a semiconductor device is or includes a transistor, various simulations results may be obtained according to values of process variables with respect to one or more of a threshold voltage of the transistor, a current flowing in each of turn-on and turn-off states, a channel length and junction depth of the transistor, etc. As will be described below, the simulation result value may be compared with a previously determined target value in a process of designing the semiconductor device, and improvement or optimization of design variables and/or process variables may be performed until the result value matches or is at least close to matching the target value or a difference therebetween falls within a certain range. Semiconductor devices having characteristics suitable for target data may be formed by performing the semiconductor process based on adjusted design variables and/or process variables, and hence there may be an improvement in semiconductor device performance and/or yield and/or processing time.

When the process conditions are determined, the semiconductor fabrication process may proceed accordingly (S14), e.g. based on the simulations. Even in the same semiconductor process, semiconductor devices having different characteristics may be formed according to the process conditions. For example, even in a field effect transistor formed by the same ion implantation process, deposition process, etching process, etc., electrical characteristics such as a current-voltage curve and/or a threshold voltage may appear differently depending on difference between the process conditions. Alternatively or additionally, structural characteristics of semiconductor devices may vary depending on difference between the process conditions.

Figure 2A:
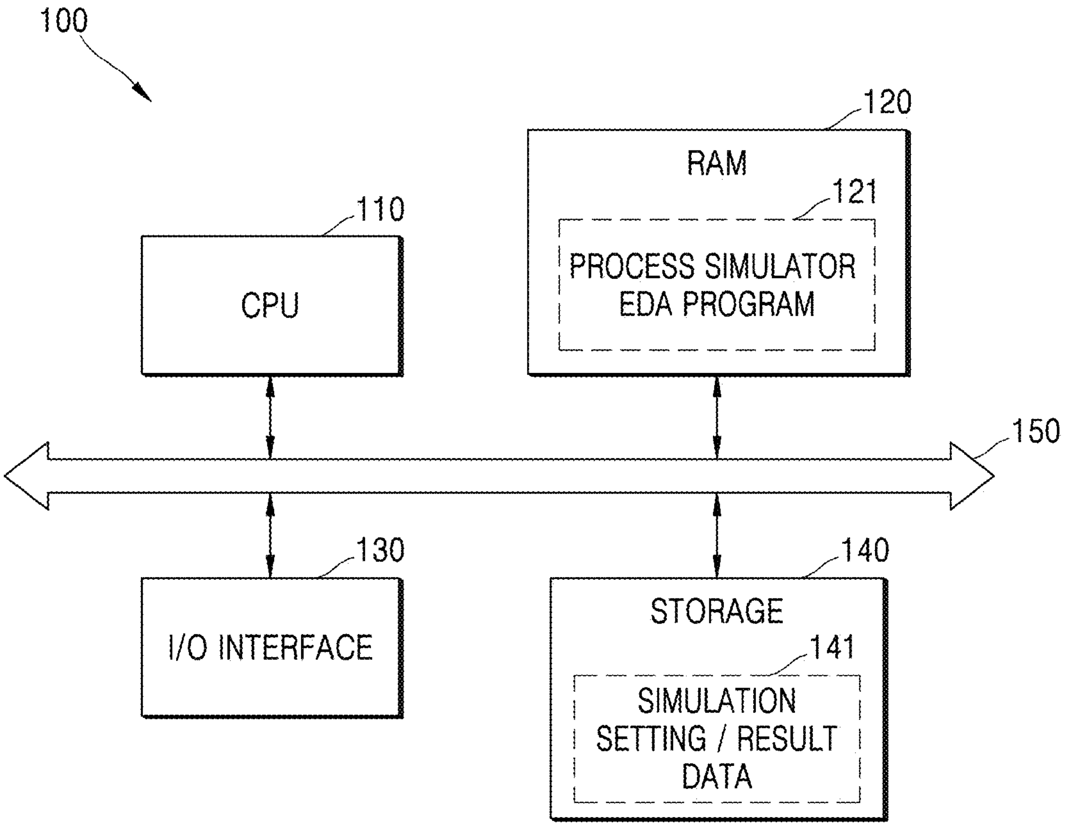
FIGS. 2A and 2B are block diagrams illustrating a process simulation system and a server according to some example embodiments.
Figure 2B:
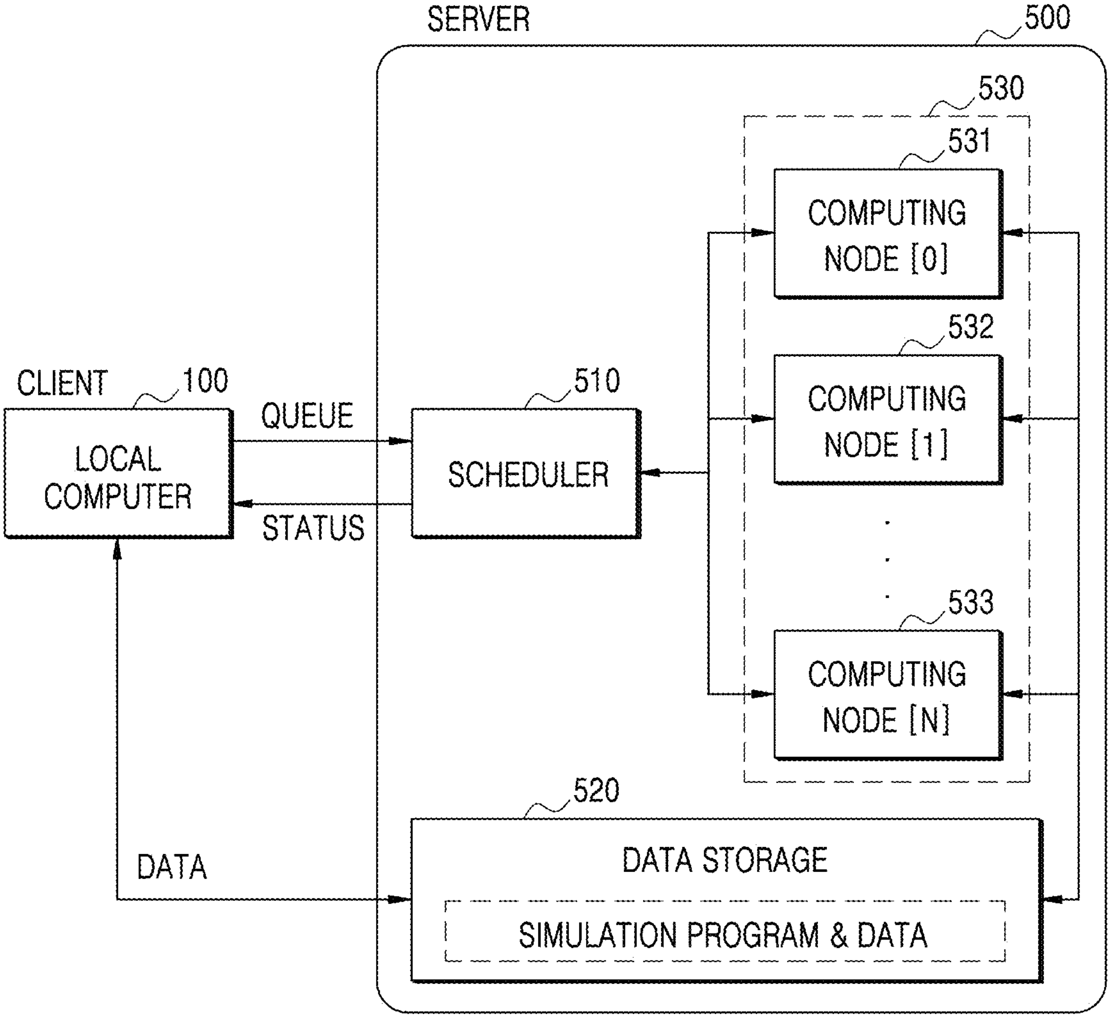

FIGS. 2A and 2B are block diagrams illustrating a process simulation system and a server according to some example embodiments.

Referring to FIGS. 2A and 2B, a local computer 100, which is a process simulation system, may include a CPU 110, RAM 120, an input/output (I/O) interface 130, a storage 140, and a system bus 150. The local computer 100 may be or may include or be included in, for example, a computer and/or a jobstation that runs a design program such as a TCAD and/or electronic computer-aided design (ECAD) simulation program. Here, the local computer 100 may perform simulation improvement or optimization using an algorithm and/or a device to which a simulation improvement or optimization method according to some example embodiments is applied. The CPU 110 may execute software (e.g., one or more of application programs, operating systems, and device drivers) to be executed on the local computer 100. The CPU 110 may execute an operating system (OS) loaded into the RAM 120, and various application programs to be driven based on the OS. For example, the CPU 110 may receive simulation execution conditions set by a user and/or the like using a process simulator 121 (e.g., an electronic design automated (EDA) program) loaded into the RAM 120. In addition, the CPU 110 may improve or optimize the simulation environment by applying the simulation improvement or optimization method according to some example embodiments.

The OS or application programs may be loaded into the RAM 120. When the local computer 100 is booted, an OS image stored in the storage 140 may be loaded into the RAM 120 through a booting sequence. All input/output operations of the local computer 100 may be supported by the OS. Similarly, the application programs (e.g., the process simulator 121) may be loaded into the RAM 120 to be selected by the user or the like or to provide basic services. In particular, simulation setting/result data 141 including data used to execute a simulation and/or simulation result values may also be loaded into the RAM 120 from the storage 140. The RAM 120 may be or include a volatile and/or nonvolatile memory such as Static Random Access Memory (SRAM) and/or Dynamic Random Access Memory (DRAM), Phase-change RAM (PRAM), Magnetic Random Access Memory (MRAM), Resistance RAM (ReRAM), ferroelectric RAM (FRAM), NOR flash memory, etc. In some example embodiments, the local computer 100 may automate semiconductor design through the process simulator 121 (e.g., the EDA program) loaded into the RAM 120. For example, the user and/or the like may input conditions of simulation to be executed, and such simulation setting data 141 may be stored in the storage 140.

The process simulator 121 may perform improvement or optimization according to some example embodiments based on the simulation setting data 141 and the like, as described above. For example, the process simulator 121 (e.g., the EDA program) may improve or optimize the simulation by reflecting or taking into account of various characteristics of parameters in each operation of the process. The process simulator 121 may be improved or optimized by preventing or reducing the likelihood of the same operation from being repeatedly performed in several nodes when s simulation is executed under various conditions through an improvement or optimization process using parameters. These features will be described in more detail through the drawings to be described below.

The I/O interface 130 controls user input and output from user interface devices. For example, the I/O interface 130 may be provided with a keyboard and/or a monitor to receive commands or data from the user; however, example embodiments are not limited thereto. The process simulator 121 may receive simulation data (e.g., parameter data) used by the process simulator 121 through the I/O interface 130. Also, the I/O interface 130 may display progress and processing results of each simulation operation of the local computer 100.

The storage 140 may be provided as a storage medium of the local computer 100. The storage 140 may store one or more of application programs, OS images, and various pieces of data. Alternatively or additionally, the storage 140 may store and update simulation setting data 141 for operation of the process simulator 121 and/or simulation result data 141 according to operation of the server 500. The storage 140 may be provided as or include or be included in one or more of a memory card (MMC, eMMC, SD, MicroSD, etc.) or a hard disk drive (HDD). The storage 140 may include a NAND-type flash memory having a large storage capacity. Alternatively or additionally, the storage 140 may include a next-generation nonvolatile memory such as one or more of PRAM, MRAM, ReRAM, FRAM, or NOR flash memory.

The system bus 150 is for providing a netjob inside the local computer 100. Through the system bus 150, the CPU 110, the RAM 120, the I/O interface 130, and the storage 140 may be electrically connected and exchange data with each other. However, the configuration of the system bus 150 is not limited to the above description, and may further include other methods for efficient management.

According to the above description, the local computer 100 may perform improvement or optimization according to the operation of the process simulator 121, and the server 500 may execute a simulation of the semiconductor manufacturing process. In addition, when a final profile is provided, profiles generated in an intermediate operation corresponding thereto may also be provided by the local computer 100.

In some example embodiments, the server 500 corresponding to a client may include a scheduler 510, a plurality of computing nodes 531, 532, . . . , 533, and a data storage 520.

The server 500 according to some example embodiments may receive data (e.g., data related to a queue) required or used or desirable for use in simulation execution from the client (e.g., the local computer 100). For example, as described above, the CPU 110 of the local computer 100 may receive simulation setting conditions and/or the like from the user through the I/O interface 130, and the process simulator 121 may improve or optimize the simulation based on the simulation setting conditions and the like. In order to execute the simulation according to improvement or optimization results, the local computer 100 may issue an improved or optimized queue and provide the improved or optimized queue to the server 500.

In some example embodiments, the scheduler 510 of the server 500 may receive the queue and assign a job to each of the plurality of computing nodes 531, 532, . . . , 533 to perform the queue. Alternatively or additionally, the scheduler 510 may provide the status of the server 500 to the local computer 100. The data storage 520 of the server 500 may include a simulation program for executing the simulation itself, and may receive data for executing the simulation from the local computer 100. The data storage 520 may provide the data to the plurality of computing nodes 531, 532, . . . , 533, and the plurality of computing nodes 531, 532, . . . , 533 may perform the job provided from the scheduler 510 based on the data. The plurality of computing nodes 531, 532, . . . , 533 may obtain result data by executing the simulation and store the result data in the data storage 520. The result data may be provided to the storage 140 of the local computer 100 and stored as the simulation result data 141.

Figure 3:
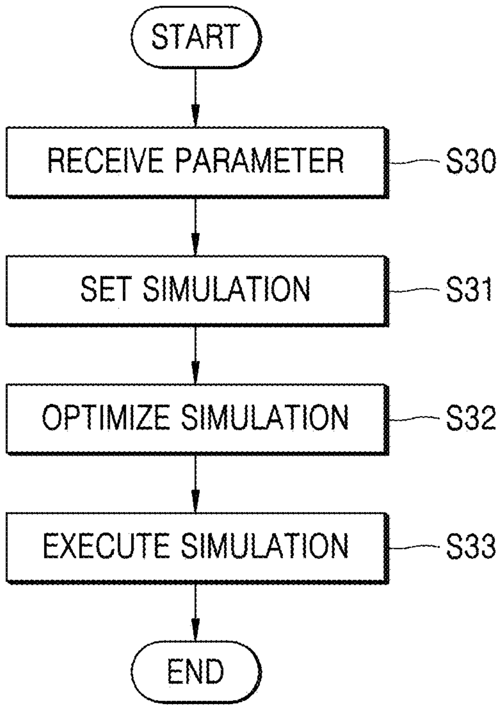
FIG. 3 is a flowchart illustrating a method of simulating a semiconductor process according to some example embodiments.

FIG. 3 is a flowchart illustrating a method of simulating a semiconductor process according to some example embodiments.

Referring to FIGS. 1 to 3, the local computer 100 may improve or optimize a simulation environment through the process simulator 121 and may provide an optimized or improved queue ordering to the server 500, and the server 500 may execute a semiconductor process simulation. A process of improving or optimizing the simulation using parameters may be included in operation S13 of determining process parameters of FIG. 1. The process simulator 121 may receive data necessary for or used for or desirable for simulation execution through the I/O interface 130. The process simulator 121 may receive parameters used in the simulation and set by a user or the like from the outside (S30). The user and/or the like may assign various values to the parameters used in the simulation in order to observe or simulate semiconductor processes being performed under various conditions. The process simulator 121 may receive a plurality of parameters necessary for or desirable for or used for the process, and thus, each of the plurality of parameters may have various values. The process simulator 121 may specifically set a simulation to be executed using the received parameters according to simulation conditions designed by the user (e.g., according to layout design condition) (S31).

Then, the process simulator 121 may improve or optimize a simulation process according to some example embodiments (S32). As will be described in detail below, the process simulator 121 may improve or optimize the simulation environment by reducing nodes with redundant operations by ordering the received parameters, and may execute the simulation through the server 500 (S33). For example, when the server 500 executes simulations according to various conditions, there may be cases in which the same operation is repeatedly performed in different operation nodes even under the same or similar conditions. However, the use of hardware resources may be reduced by automatically improving or optimizing a simulation environment through the improvement or optimization process (S32) described above, and thus, the simulation may be repeatedly executed through improved or optimal resource allocation without redundancy of operation resources.

Figure 4:
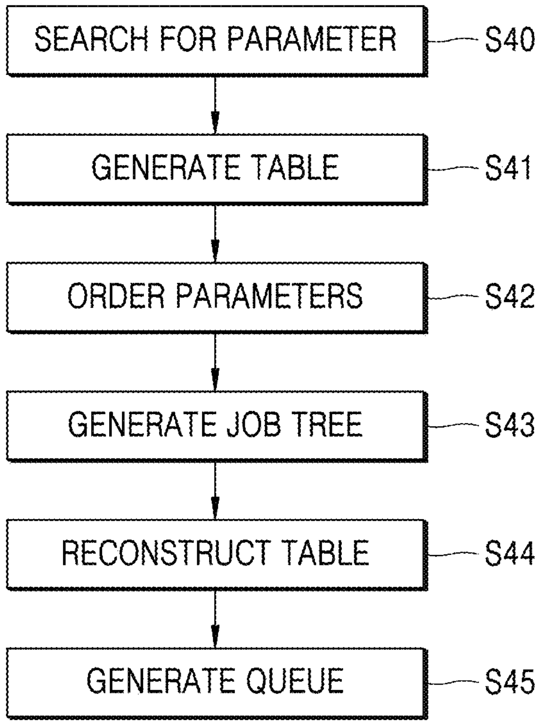
FIG. 4 is a flowchart illustrating an improvement or optimization operation of a semiconductor process simulation according to some example embodiments.

FIG. 4 is a flowchart illustrating an improvement or optimization operation of a semiconductor process simulation according to some example embodiments.

Referring to FIGS. 2 to 4, the process simulator 121 may perform improvement or optimization by receiving a plurality of parameters having various values from a user or the like. The process simulator 121 may perform parameter search (which may be referred to as parameter sorting) in which parameters used according to a simulation execution order are listed in an execution order (S40). The process simulator 121 may create a parameter table by receiving the plurality of parameters listed through the search as above (S41). The process simulator 121 may compare values of each parameter based on the parameter table, as will be described below. The process simulator 121 may order the parameters according to a certain reference, based on a comparison result (S42). After ordering the parameters, the process simulator 121 may generate a job tree based on the ordered parameters and values of the parameters (S43). The process simulator 121 may reconstruct the table according to the generated job tree (S44), and may store jobs in a queue based on the reconstructed table (S45).

FIG. 5 is a flowchart illustrating a parameter ordering method of a semiconductor process simulation according to some example embodiments.

Referring to FIGS. 4 and 5, the process simulator 121 may receive a plurality of parameters paraA, paraB, paraC, and paraD from a user and/or the like. Although four parameters are discussed, example embodiments are not limited thereto. Each of the plurality of parameters may have various values according to each simulation condition set by the user and/or the like. In FIG. 5, the different parameters are arranged on different rows, while the different simulation conditions and/or different experimental process conditions are arranged on different columns; however, example embodiments are not limited thereto. In some example embodiments, paraA may have a value of 1.0 as a first simulation condition, a value of 1.0 as a second simulation condition, and a value of 2.0 as a third simulation condition. At least some of the parameters may have particular units such as percentages and/or electrical and/or physical units; however, example embodiments are not limited thereto. In some example embodiments, the units of each of the parameters paraA, paraB, paraC, and paraD may be the same as each other. Each of the plurality of parameters paraA, paraB, paraC, and paraD may include various values set by the user and/or the like to simulate semiconductor processes being performed under different conditions or different experimental conditions. As shown, the process simulator 121 may search parameters used according to the execution order of simulations (first to third simulation conditions) and may list the parameters in the execution order (S40 of FIG. 4). The process simulator 121 may receive the plurality of parameters paraA, paraB, paraC, and paraD having various values, may list the plurality of parameters through parameter search (S40 in FIG. 4), and may create a first parameter table 51 based on the plurality of parameters (S41 in FIG. 4).

The process simulator 121 may order the parameters based on the first parameter table 51. For example, the process simulator 121 may search for the plurality of parameters paraA, paraB, paraC, and paraD included in the first parameter table 51, and may compare values of the plurality of parameters paraA, paraB, paraC, and paraD under successive simulation conditions among all simulation conditions. For example, paraB has values of 3, 4, and 3, respectively, under the first to third simulation conditions, and paraC has values of 30, 30, and 30, respectively, under the first to third simulation conditions. The process simulator 121 may determine whether the values of the plurality of parameters paraA, paraB, paraC, and paraD are the same as each other under successive simulation conditions. For example, because paraA has a value of 1.0 in the first simulation condition and a value of 1.0 in the second simulation condition, paraA has the same value under successive simulation conditions. However, because paraA has values of 1.0 and 2.0 under the second and third simulation conditions, respectively, paraA has different values. Because paraB has values of 3, 4, and 3 under the first to third simulation conditions, respectively, paraB does not have the same value under successive simulation conditions. On the other hand, paraC has a value of 30 under all of the first to third simulation conditions while paraD has a value of 40 under all of the first to third simulation conditions, paraC has the same value under all successive simulation conditions and paraD has the same value under all success simulation conditions.

In some example embodiments, the process simulator 121 may order the plurality of parameters paraA, paraB, paraC, and paraD based on determining whether the plurality of parameters paraA, paraB, paraC, and paraD have the same value as described above. For example, the process simulator 121 may assign a higher priority in an ordering as the number of times the parameters have the same value under successive simulation conditions increases. For example, as described above, because paraA has the same value under the first and second simulation conditions, but has different values under the second and third simulation conditions, the same number of times is one. Because paraB has no same value under successive simulation conditions, the same number of times is zero. Because paraC has the same value under all of the first to third simulation conditions, the same number of times is two. Because paraD has the same value under all of the first to third simulation conditions, the same number of times is two. A higher priority may be assigned to a parameter having a greater or same number times; in this case, the highest priority (e.g., a first priority) may be assigned to paraC and paraD having the same number of times of 2. Similarly, a second priority may be assigned to paraA, and a third priority may be assigned to paraB.

The process simulator 121 may receive the plurality of parameters paraA, paraB, paraC, and paraD, may assign priorities to the plurality of parameters paraA, paraB, paraC, and paraD according to a certain criterion, and may order the plurality of parameters paraA, paraB, paraC, and paraD based on the priorities. In this case, the plurality of parameters paraA, paraB, paraC, and paraD may be ordered in the order of paraC-paraD-paraA-paraB according to the priorities, and the process simulator 121 may re-order the first parameter table 51 according to the plurality of ordered parameters and construct a second parameter table 52.

A process of generating a queue or a simulation queue may be simplified and a simulation process may be improved or optimized as will be described below, by ordering the parameters used in the simulation. Parameter ordering for improvement or optimization above is automatically performed according to a certain reference as described above, and thus, a user and/or the like may manually edit the array of parameters and/or the tree structure of simulation to improve or optimize a simulation environment, which may effectively reduce a lot of time and cost.

Figure 6A:
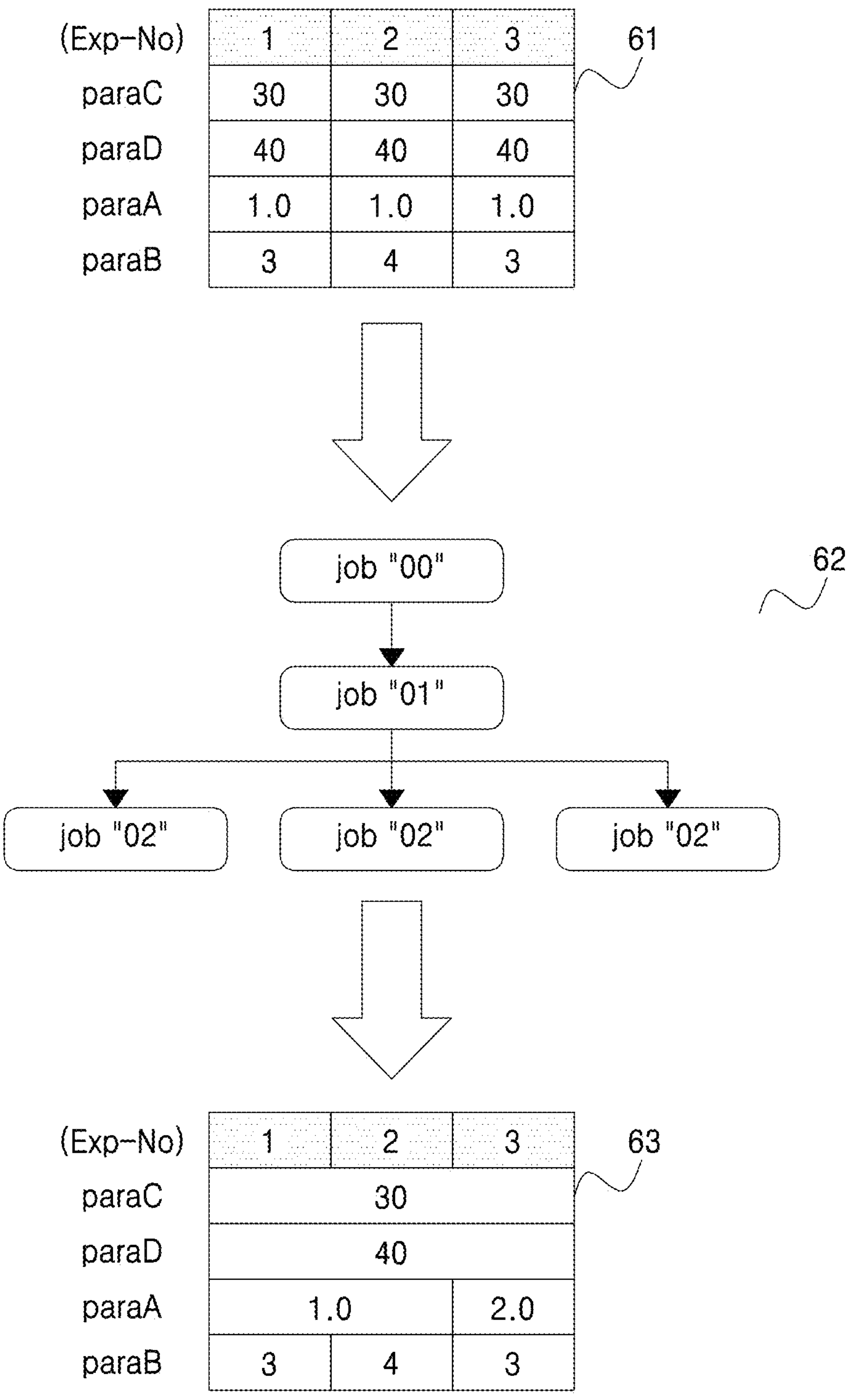
FIGS. 6A and 6B are flowcharts illustrating operations of creating a job tree and a table of a semiconductor process simulation according to some example embodiments.
Figure 6B:
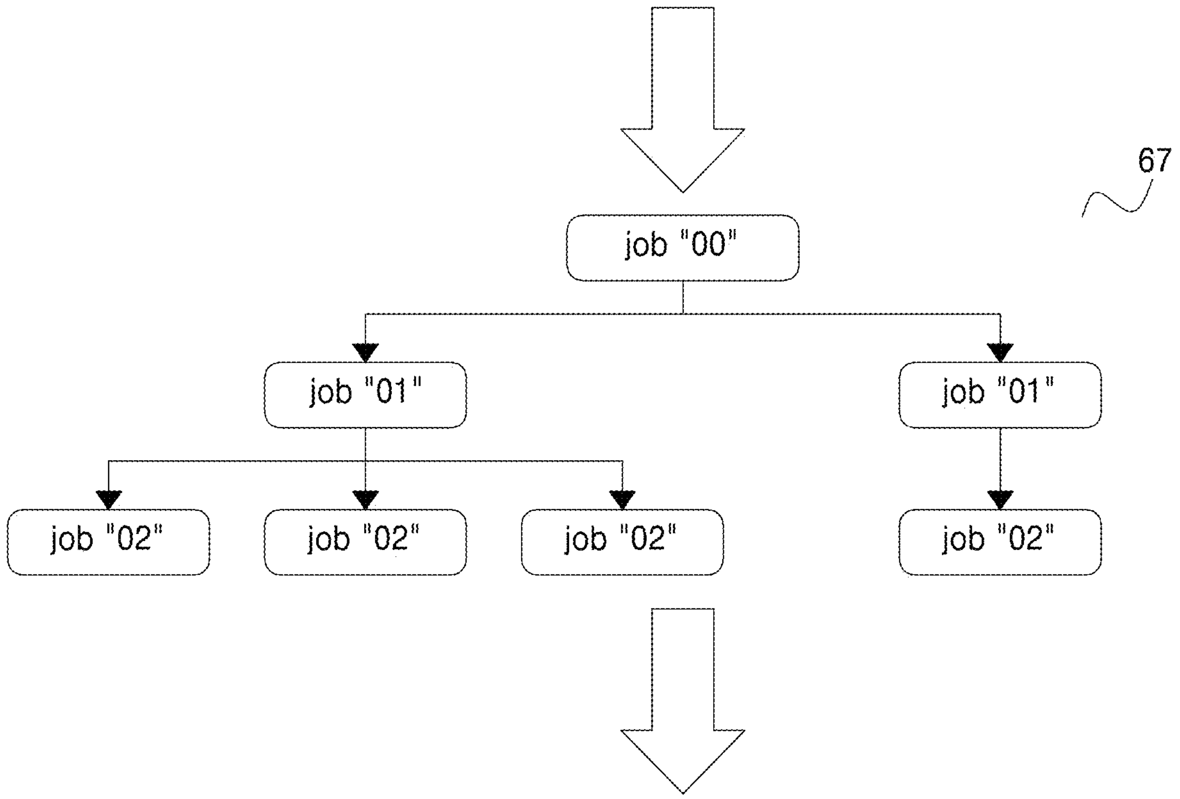

FIGS. 6A and 6B are flowcharts illustrating operations of creating a job tree and a table of a semiconductor process simulation according to some example embodiments.

Referring to FIGS. 5 and 6A, the process simulator 121 may generate a first job tree 62 based on the second parameter tables 52 and 61 constructed by re-ordering the first parameter table 51. Specifically, because paraC has the same value under first to third simulation conditions, a total of three operations are not performed in three nodes corresponding to the respective simulation conditions, but only one operation may be performed on paraC in the operation node corresponding thereto. Therefore, because a job that performs this may be executed only once, corresponding Job “00” may be executed. Similarly, because paraD has the same value under the first to third simulation conditions, only one operation may be performed on paraD in the corresponding operation node, and Job “01” corresponding thereto may be executed. Thereafter, with respect to paraA and paraB, because paraA has the same value under the first and second simulation conditions, an operation may be performed in one corresponding node under the first and second simulation conditions. However, because paraB has no same value under successive simulation conditions, three different operations need to or are expected to occur for each simulation condition. Therefore, operation Job “02” may be executed on paraA and paraB three times.

Through the above process, the process simulator 121 may generate a first job tree 62 based on the plurality of ordered parameters paraA, paraB, paraC, and paraD of the second parameter table 61. Subsequently, the process simulator 121 may reconstruct the second parameter table 61 into a third parameter table 63 based on the first job tree 62. For example, when a parameter has the same value under successive simulation conditions as reflected in the first job tree 62, only one hardware resource corresponding to the job needs to be and/or is sufficient to be used. Thus, the process simulator 121 may reconstruct the second parameter table 61 like the third parameter table 63 according to Job “00” to Job “02” of the first job tree 62.

Referring to FIG. 6B, the process simulator 121 may generate a second job tree 67 based on a fourth parameter table 66 configured according to another embodiment.

In the same way as described above, because paraC has a value of 30 under all of first to fourth simulation conditions, the same number of times is 3, and thus, the highest priority may be assigned to paraC. Because paraD has the same number of times of 2, a second priority may be assigned to paraD, and third and fourth priorities may be assigned to paraA and paraB, respectively. Because the process simulator 121 may order the plurality of parameters paraA, paraB, paraC, and paraD based on priorities, the process simulator 121 may construct a fourth parameter table 66 by ordering the plurality of parameters in the order of paraC-paraD-paraA-paraB.

Specifically, because paraC has the same value under the first to fourth simulation conditions, a total of four operations are not performed in different nodes, but only one operation may be performed on paraC in the operation node corresponding thereto, and thus, Job “00” corresponding thereof may be executed only once. Because paraD has the same value under the first to third simulation conditions, but has a different value under the fourth simulation condition, operations are required to be performed in different nodes, and thus, Job “01” corresponding to paraD needs to be executed twice. For example, Job “00” is executed only once, but the next job, Job “01”, needs to be or is expected to be executed twice, and thus, the second job tree 67 needs to or is expected to branch into two. Thereafter, with respect to paraA and paraB, because paraA has the same value under the first and second simulation conditions, an operation may be performed in the corresponding one node, but paraB has no same value under successive simulation conditions. Therefore, three different operations need to occur under the first to third simulation conditions in which paraD has a value of 40. Therefore, here when Job “02” is executed, the second job tree 67 needs to or is expected to branch into three.

Through the above process, the process simulator 121 may generate the second job tree 67 based on the plurality of ordered parameters paraA, paraB, paraC, and paraD of the fourth parameter table 66. Then, as reflected in the second job tree 67, when a parameter has the same value under successive simulation conditions, only one hardware resource corresponding to each job needs to be used. Thus, the process simulator 121 may reconstruct the second parameter table 66 like a third parameter table 68 according to branch structures represented by Job “00” to Job “02” of the second job tree 67.

As a result, process of generating a queue may be simplified by ordering the parameters used in a simulation and improving or optimizing the simulation process. Alternatively or additionally, because the improvement or optimization process above is automatically performed as described above, and thus, a user and/or the like may manually edit the array of parameters and/or the tree structure of simulation to improve optimize a simulation environment, which may effectively reduce a lot of time and cost.

Alternatively or additionally, this may prevent or reduce the likelihood of the same operation from being performed redundantly in different nodes despite the same operation under various simulation conditions. Therefore, computing resources are not redundant but are allocated more efficiently, and thus, the simulation may be efficiently executed.

Figure 7:
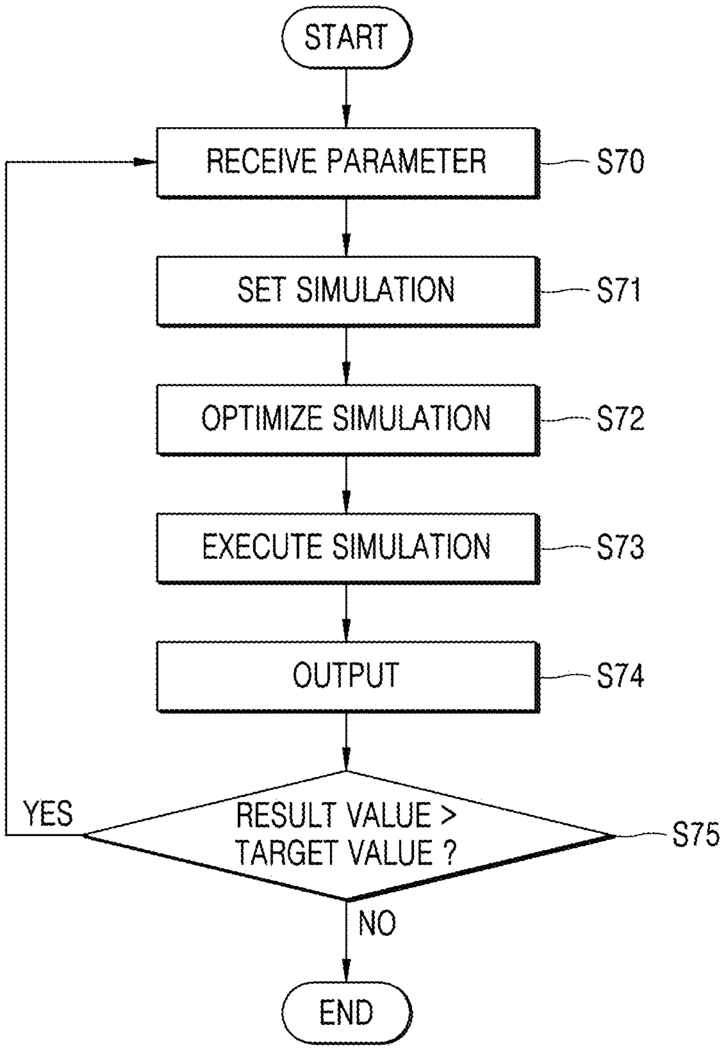
FIG. 7 is a flowchart illustrating a simulation method of a semiconductor process according to another embodiment.

FIG. 7 is a flowchart illustrating a simulation method of a semiconductor process according to another embodiment.

Referring to FIGS. 3 and 7, the process simulator 121 may perform improvement or optimization by repeating a simulation until a desired result is obtained based on an optimized simulation environment. Operations S70 to S73 in FIG. 7 may correspond to operations S30 to S33 as described above with reference to FIG. 3. For example, the process simulator 121 may receive a parameter to set the simulation environment, perform the improvement or optimization process as described above with reference to FIGS. 4 to 6, and execute the simulation through a server (S70 to S73).

The process simulator 121 may receive the result of simulation execution from the server where the simulation was executed and output the result as data (S74). For example, the result of simulating the process based on values of various parameters set by a user may be displayed as a numerical value to determine whether a target value to be achieved has been reached. The process simulator 121 may compare such a result value with the target value to be achieved (S75). When the result value is equal to or smaller than the target value, the process simulator 121 may end the simulation because the target has been achieved. However, when the result value is greater than the target value, because the target cannot be achieved with set simulation conditions, the above-described simulation improvement or optimization process may be repeated by receiving parameters constituting simulation conditions different from the existing simulation conditions.

For example, as a result of performing a simulation with a setting (e.g., setting including the first parameter table 51, first setting) including the plurality of parameters paraA, paraB, paraC, and paraD constituting first to third simulation conditions, when a simulation result value is greater than the target value, the simulation may be repeatedly improved or optimized with setting (second setting) including the plurality of parameters paraA, paraB, paraC, and paraD constituting conditions different from the first to third simulation conditions. Furthermore, simulation execution under different conditions may be repeated by setting first to Nth settings until a simulation execution result value of the server is equal to or smaller than the target value. However, example embodiments are not limited to the embodiment of FIG. 7, and the simulation process may be repeated when the result value is not within a target range by determining whether the result value is within the target range.

Figure 8:
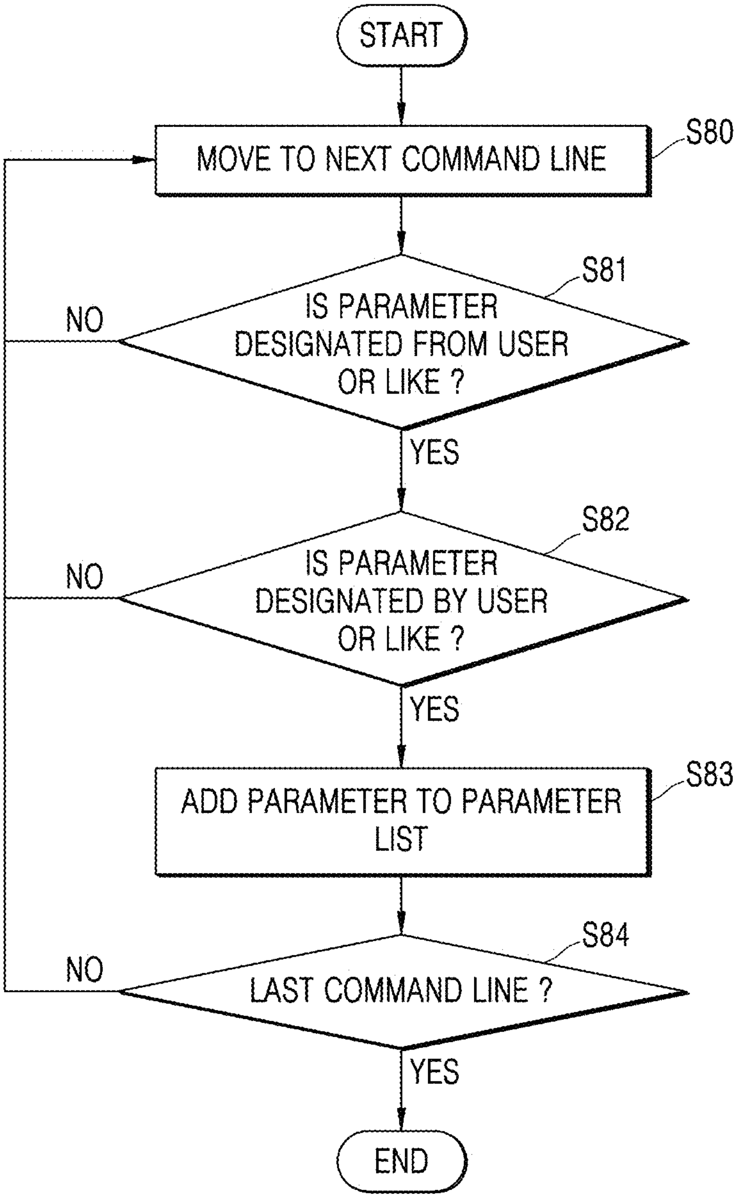
FIG. 8 is a flowchart illustrating a parameter confirmation function of a semiconductor process simulation according to some example embodiments.

FIG. 8 is a flowchart illustrating a parameter confirmation function of a semiconductor process simulation according to some example embodiments.

Referring to FIGS. 4 and 8, the process simulator 121 may create a parameter table by receiving a plurality of parameters from a user or the like (S41). At this time, the process simulator 121 generates a parameter list indicating which parameters are used by confirming command lines (e.g., code lines) as described below in FIG. 10 to create the parameter table. For example, in a simulation process, the process simulator 121 may perform a parameter search before executing a simulation, in order to determine which parameters among defined parameters (parameters defined by a user, etc.) are used, and where variable is parameterized during the simulation process, according to the execution order of each simulation. In order to more quickly and/or more accurately perform the parameter search, the user and/or the like may designate whether an input value is a parameter or a string itself, and the process simulator 121 may include a function of confirming the designated parameter. For example, when the value input by the user is "Oxide", the user may designate and input whether the value is a string or a parameter representing a material such as SiO or $SiO_2$ as an 'Oxide variable'. When the value is designated as the parameter, the process simulator 121 may recognize "Oxide" as the parameter, add "Oxide" to the parameter list, and may create the parameter table.

Specifically, the process simulator 121 may confirm the command lines to search for used parameters (S80). The process simulator 121 may determine whether the parameter is designated from the user or the like (S81). When the user does not designate data as a parameter but inputs the data as a string itself, the process simulator 121 may move to the next command line because the corresponding data is not a parameter (S80). When the user designates the corresponding data as a parameter, the process simulator 121 may determine whether the corresponding parameter is included in the parameters defined by the user or the like (S82).

When the corresponding parameter is included in the parameters defined by the user and/or the like, because normal use of the parameter has been made within the received parameters, the process simulator 121 may add the parameter to the parameter list (S83). When the corresponding parameter is not a defined parameter, because the parameter is not used within the received parameters, the process simulator 121 may ignore the parameter and move to the next command line (S80). Finally, the process simulator 121 may determine whether the command line being confirmed is the last one (S84). When the command line being confirmed is last command line, because a confirmation operation is completed, the process simulator 121 may end the parameter search.

Through this, the process simulator 121 may distinguish a data type of the input value; for example, whether the input value is a string itself or a parameter, and thus, an error in which a simulation is executed with an incorrectly input or recognized data type may be prevented. Alternatively or additionally, because the process simulator 121 may know which data is designated as a parameter, before the server executes the simulation, the process simulator 121 may know which parameters among the defined parameters are used, and where the data is parameterized during the simulation process. Accordingly, the process simulator 121 may speed up the operation of searching for the parameters and prioritization process for performing operation S42 of ordering parameters described above.

Figure 9:
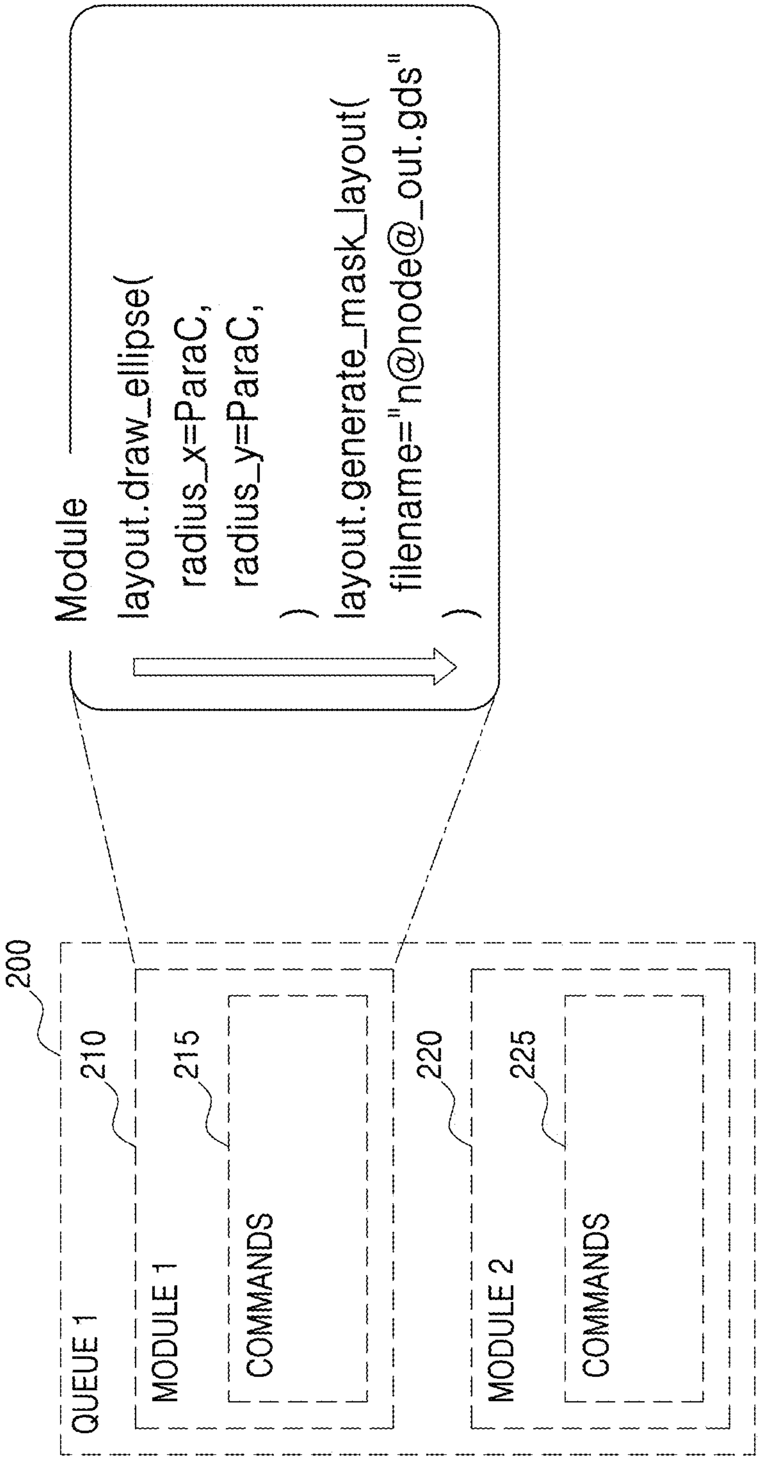
FIG. 9 is a diagram illustrating modules and commands constituting a queue of a semiconductor process simulation according to some example embodiments.

FIG. 9 is a diagram illustrating modules and commands constituting a queue of a semiconductor process simulation according to some example embodiments.

Referring to FIG. 9, the process simulator 121 may confirm queues, modules, commands (codes), etc., which are components of a simulation, while a server executes the simulation. A queue in which jobs to be performed by the server are stored in order may include one or more modules, and a module may include one or more commands (codes).

For example, a first queue 200 may include a first module 210 and a second module 220. The first module 210 may include a first command group 215, and the second module 220 may include a second command group 225. As will be described below, the first queue 200 may sequentially receive the first module 210 and the second module 220, and may store jobs in the order of execution. The first command group 215 included in the first module 210 may include commands defining paraC (e.g., a variable representing a radius length) used for layout design as shown. Alternatively or additionally, the first command group 215 may include a command for a mask layout used for mask generation.

Figure 10:
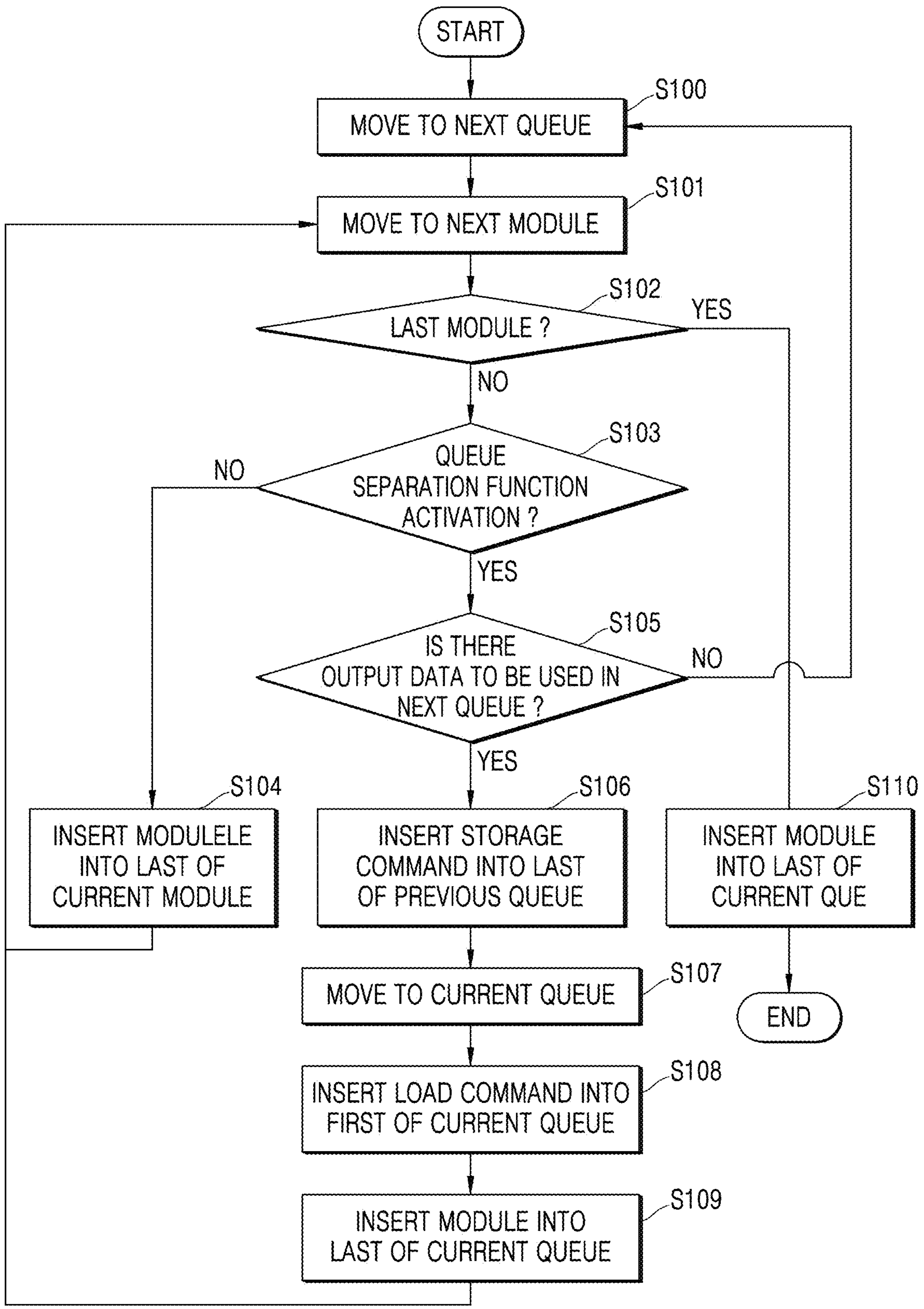
FIG. 10 is a flowchart illustrating a queue separation function of a semiconductor process simulation according to some example embodiments.

FIG. 10 is a flowchart illustrating a queue separation function of a semiconductor process simulation according to some example embodiments.

Referring to FIGS. 4, 9, and 10, the process simulator 121 may generate a queue based on a reconstructed parameter table (S45). In this process, a user may set a simulation to be executed by generating a new queue rather than the existing queue through activation of a queue separation function.

Specifically, the process simulator 121 may move to a next queue and move to a next module within the corresponding queue (S100 and S101). When the moved module is a last module, because there is no more module to be confirmed after the corresponding module, the process simulator 121 may insert the corresponding module into the last of a current queue and then end queue generation (S110).

When the moved module is not the last module, the process simulator 121 may determine whether the queue separation function is activated (S103). For example, a user may designate whether to generate a new queue and execute a simulation, and the process simulator 121 may determine whether the user has activated the queue separation function. When the queue separation function is not activated, because module execution occurs within the corresponding queue without generating a new queue, the process simulator 121 may insert a module into the last of the current queue and then move to the next module (S104 and S101).

Figure 11A:
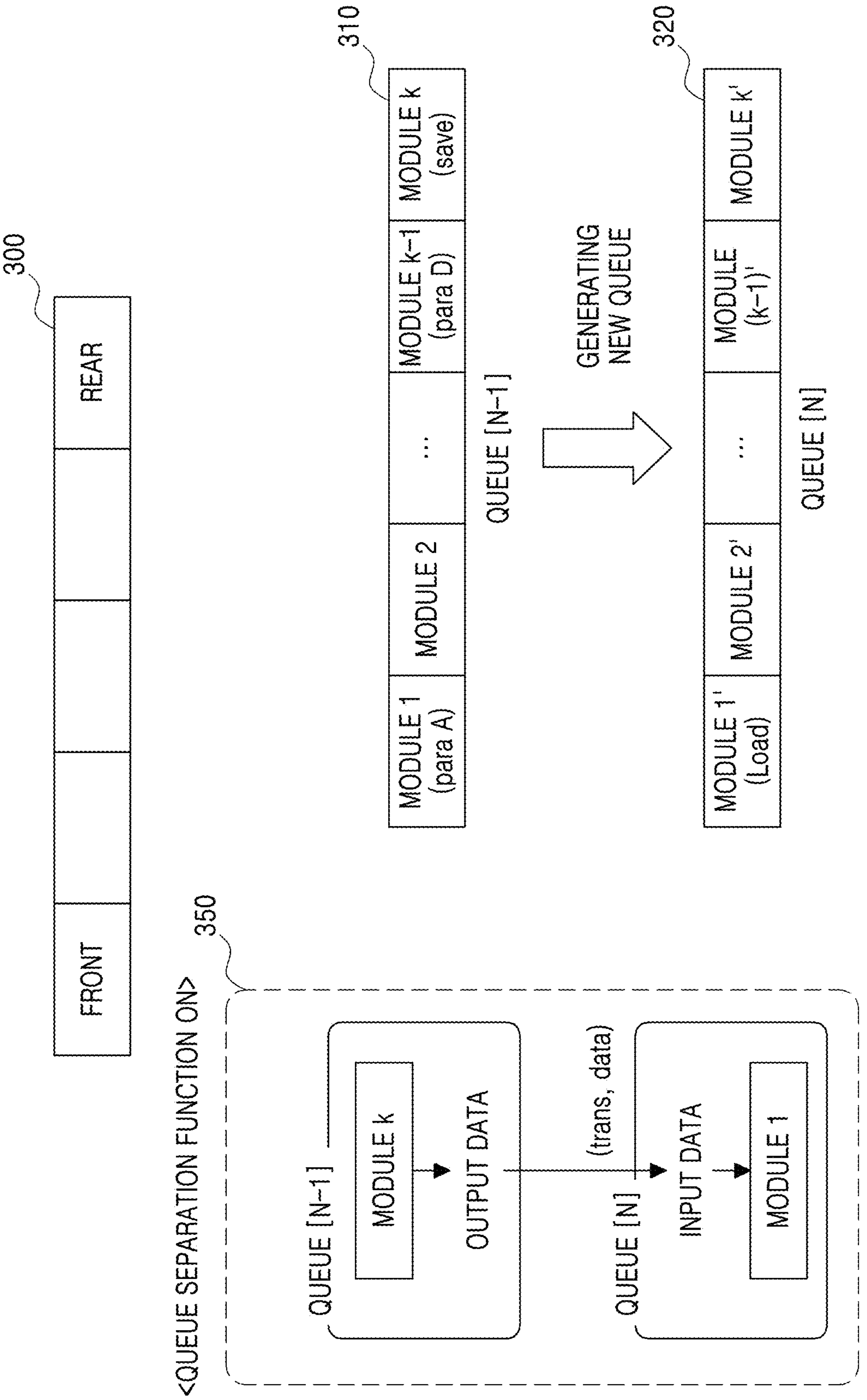
FIGS. 11A and 11B are diagrams illustrating an operation process of a queue separation function of a semiconductor process simulation according to some example embodiments.

In the simulation setting, when the user activates the queue separation function to generate and calculate a new queue in the corresponding module, as shown in FIG. 11A to be described below, because the new queue is generated by being separated from the existing queue, the process simulator 121 may determine whether output data generated in the existing queue is used in the newly generated queue (S105). When a queue to be newly generated does not require data of a previous queue, the process simulator 121 may move to the next queue (S100) because a data transfer is not required. When the queue to be newly generated uses the data of the previous queue, the output data needs to be transferred. Accordingly, the process simulator 121 may store the output data of the existing queue, move to the newly generated queue, and load the stored output data in order to transfer the output data of the existing queue (S106 to S108). Thereafter, the process simulator 121 may insert the current module into the last of the newly generated queue, that is, the current queue, and then move to the next module (S109 and S101).

Switching between queues may be simplified through a function that allows the user to set or directly set whether to perform an operation for simulation execution in the same queue or in different queues as described above. Alternatively or additionally, when the separation function is inactivated, because simulation is continuously executed in the same node, movement of intermediate files and/or conversion of data are omitted, and thus, load due to data transmission between nodes may be reduced.

Figure 11B:
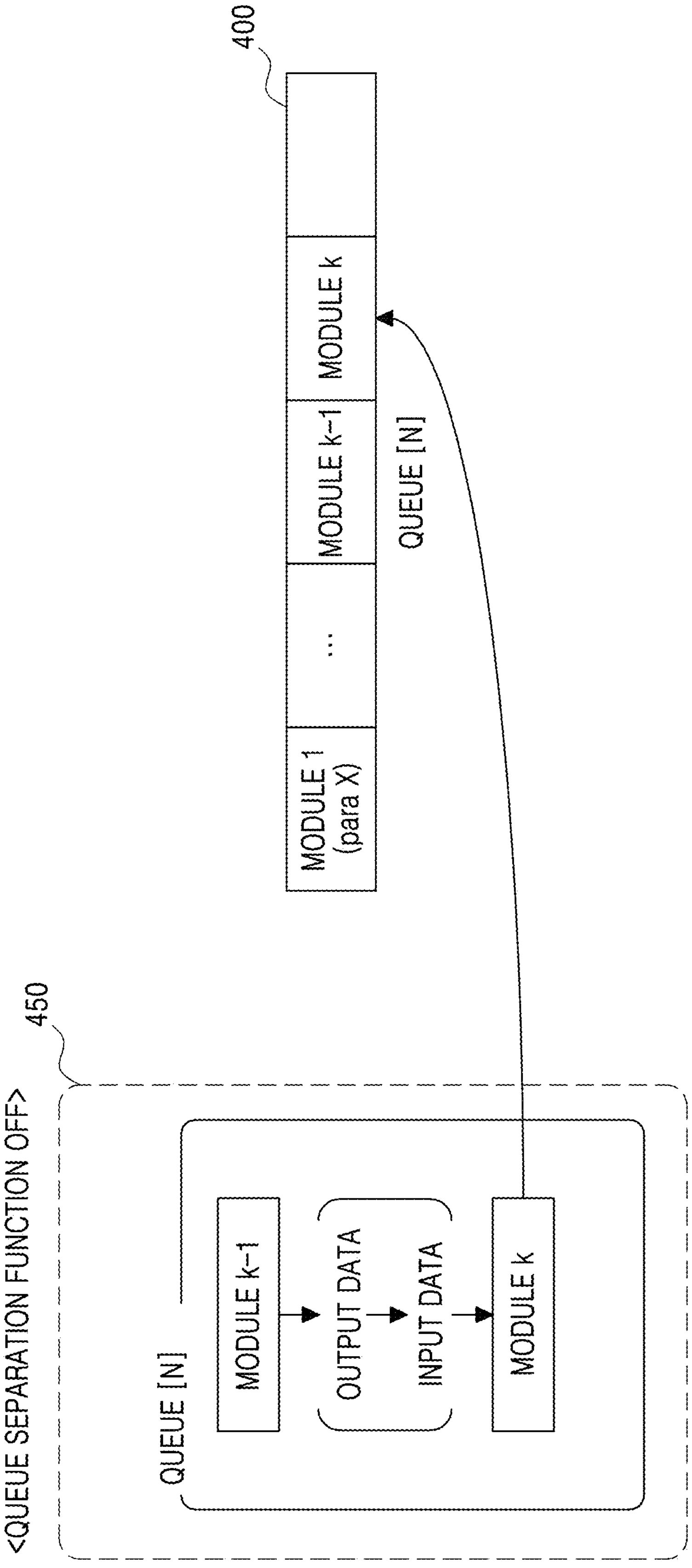

FIGS. 11A and 11B are diagrams illustrating an operation process of a queue separation function of a semiconductor process simulation according to some example embodiments.

Referring to FIGS. 9 to 11A, the process simulator 121 may separate queues between modules when a user or the like activates the queue separation function. FIG. 11A illustrates a module being performed inside a queue 300 when a queue separation occurs from a queue group 350 including an N−1th queue 310 and an Nth queue 320. The queue 300 may have an insertion operation performed in one end thereof and a deletion operation performed in the other end thereof. A first inserted element (e.g., module) is located in the front, and a last inserted element (e.g., module) is located in the rear.

As described above with reference to FIG. 10, when the N−1th queue 310 is generated based on modules, the queue separation function may be activated. At this time, there may be cases in which output data of the existing N−1th queue 310 needs to be used in the newly generated Nth queue 320. For example, in the process of generating the N−1th queue 310, module 1 including the definition of paraA, which is the highest module, may be first inserted and located in the front. Thereafter, module 2, . . . , module k−1 (e.g., modules including the definition of paraD) may be added to the N−1th queue 310 in the order of insertion. Because the output data of the N−1th queue 310 needs to be used in the Nth queue 320 to be newly generated, a command (save) for storing the output data may be inserted into module k which is the last module of the N−1th queue 310 (S106 in FIG. 10). Therefore, module k which is a storage module including a storage command may be located in the rear. In order for the newly generated Nth queue 320 to use the stored output data, a command (load) for loading the output data may be inserted into module 1' which is the first module of the Nth queue 320 (S108 of FIG. 10). Similarly, module 1' which is the highest module may be first inserted and located in the front, and module k' which is the last module may be located in the rear. Therefore, switching between queues may be simplified through a function that allows the user to directly set whether to perform an operation on simulation execution in the same queue (e.g., the N−1th queue 310) or a different queue (e.g., the Nth queue 320).

FIG. 11B illustrates a module being performed inside a queue when no queue separation occurs from a queue group 450 including an Nth queue 400. As described above with reference to FIG. 10, when the Nth queue 400 is generated based on modules, the queue separation function may be in an inactive state. In this case, because a next module is also performed within the Nth queue 400 without generating a new queue, the module needs to be continuously performed inside the Nth queue 400. For example, in the process of generating the Nth queue 400, module 1 including the definition of paraA, which is the highest module, may be first inserted and located in the front. Thereafter, module 2, . . . , module k−1 may be added to the Nth queue 400 in the order of insertion. Thereafter, because the execution of module k occurs in the Nth queue 400 without generating a new queue, module k may be inserted as it is and located in the rear of the Nth queue 400. Therefore, even when the output data of module k−1 is used as the input data of module k, because the simulation is continuously executed in the same queue, the process of moving intermediate files and/or conversion of input/output data are omitted, and thus, load due to data transmission between nodes may be reduced.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts have been particularly shown and described with reference to embodiments thereof, it will be understood that various changes in form and details may be made therein without departing from the spirit and scope of the following claims. Additionally, example embodiments are not necessarily mutually exclusive with one another. For example, some example embodiments may include one or more features described with reference to one or more figures, and may also include one or more other features described with reference to one or more other figures.

What is claimed is:

1. A simulation method of a semiconductor process, the simulation method comprising:

receiving first input data comprising values of a plurality of parameters received from outside;

setting a simulation using the plurality of parameters;

improving the simulation by ordering the plurality of parameters; and executing the simulation by processing a job stored in a queue, wherein improving the simulation includes, generating an initial table with respect to the plurality of parameters ordered based on values of a first column among a plurality of columns of the initial table, reordering the plurality of parameters to generate a plurality of reordered parameters based on the first input data and on a similarity among different columns among the plurality of columns of the initial table, generating a job tree based on the plurality of reordered parameters, constructing a new table based on the job tree and on the initial table by merging cells in the initial table together, and generating the queue by storing the job in the queue based on the new table.

2. The simulation method of claim 1, wherein reordering the plurality of parameters includes comparing values corresponding to a same parameter.

3. The simulation method of claim 2, wherein reordering the plurality of parameters includes assigning a higher priority to a parameter as a number of same values increases among values corresponding to the same parameter.

4. The simulation method of claim 3, wherein generating the job tree includes comparing values corresponding to the same parameter sequentially from a higher-ordered parameter among the plurality of reordered parameters, and branching the job tree in response to corresponding values being different from each other.

5. The simulation method of claim 1, wherein executing of the simulation includes outputting a result data value based on a result of executing the simulation based on the plurality of parameters.

6. The simulation method of claim 5, further comprising:

determining whether to end the simulation by comparing the result data value with a target value.

7. The simulation method of claim 6, wherein determining of whether to end the simulation includes determining whether to perform improvement again based on second input data when the result data value is greater than the target value.

8. The simulation method of claim 1, wherein generating the initial table includes determining whether a parameter is designated from outside and searching for the plurality of parameters having the first input data as values.

9. The simulation method of claim 1, wherein generating the queue includes converting the queue so that an operation is enabled by generating a new queue, in response to a queue separation function being activated.

10. A simulation method of a semiconductor process, the simulation method comprising:

setting one or more simulators by receiving a plurality of received parameters corresponding to input data comprising values of a plurality of parameters;

improving a simulation based on reordering of the plurality of parameters; and executing the simulation by processing a job stored in a queue, wherein improving of the simulation includes, ordering the plurality of received parameters based on a first column among a plurality of columns to generate an initial table, performing reordering of the plurality of parameters based on the input data and on a similarity among different columns of the plurality of columns of the initial table, generating a plurality of operation nodes based on the reordering, creating a new parameter table based on the plurality of operation nodes and on the initial table by merging cells in the initial table together, and generating the queue by storing the job in the queue based on the new parameter table.

11. The simulation method of claim 10, wherein the performing of the reordering of the plurality of parameters includes comparing values corresponding to a same parameter.

12. The simulation method of claim 11, wherein the reordering of the plurality of parameters includes assigning a higher priority to a parameter as a number of same values increases among values corresponding to the same parameter.

13. The simulation method of claim 11, wherein generating of the plurality of operation nodes includes merging corresponding nodes in response to values corresponding to the same parameter among the plurality of received parameters being same as each other.

14. The simulation method of claim 10, wherein executing the simulation includes representing a result of executing the simulation based on the plurality of parameters as an output value.

15. The simulation method of claim 14, further comprising:

comparing the output value with a threshold value, wherein comparing includes determining whether to perform improvement of the simulation again the simulation based on input data different from the input data in response to the output value being greater than the threshold value.

16. The simulation method of claim 10, wherein ordering of the plurality of parameters includes, determining whether a parameter is designated from outside, and searching for the plurality of parameters having the input data as values.

17. The simulation method of claim 10, wherein the generating the queue includes converting the queue so that an improvement is enabled by generating a new queue, in response to a queue separation function being activated.

18. A simulation method of a semiconductor process, the simulation method comprising:

setting one or more simulators by receiving input data comprising values of a plurality of parameters;

improving a simulation based on ordering of the plurality of parameters; and executing the simulation, wherein improving of the simulation includes, ordering the plurality of parameters based on the input data to generate an initial table, the initial table ordered based on values of a first columns among a plurality of columns of the initial table, reordering the plurality of parameters based on the input data and on a similarity among different columns from the plurality of columns of the initial table generating a job tree based on a plurality of reordered parameters, creating a new parameter table based on the job tree and on the initial table by merging cells of the initial table together, and generating a queue by storing a job in the queue based on the new parameter table, and wherein the ordering of the plurality of parameters includes, assigning a higher priority to a parameter as a number of same values increases among values corresponding to a same parameter.

19. The simulation method of claim 18, wherein generating the job tree includes, comparing values corresponding to a same parameter sequentially from a higher-ordered parameter among the plurality of parameters, and branching the job tree when corresponding values are different from each other.

20. The simulation method of claim 18, further comprising:

comparing a result value of executing the simulation with a reference value, wherein comparing includes performing the simulation again based on one or more input data different from the input data until the result value is less than or equal to the reference value when the result value is greater than the reference value.

* * * * *